United States Patent Office 3,386,261
Patented June 4, 1968

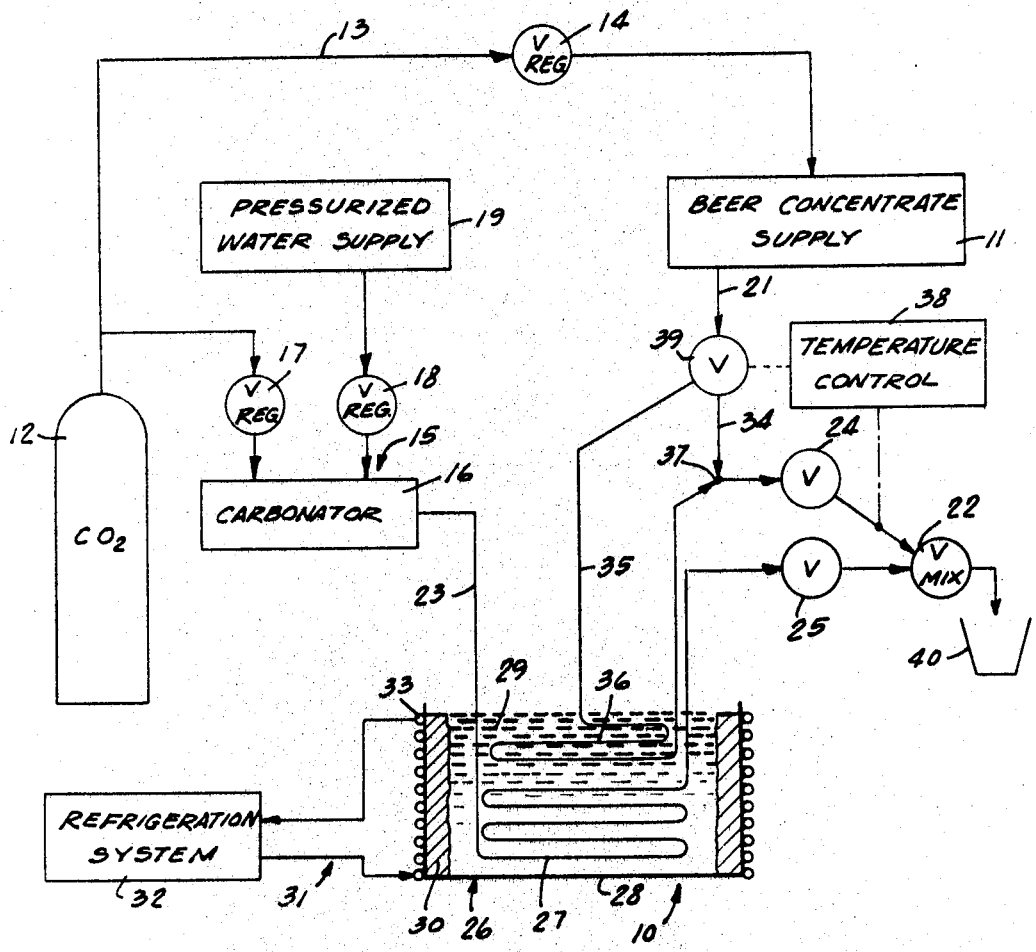

3,386,261
METHOD OF AND APPARATUS FOR DISPENSING RECONSTITUTED BEER
Richard T. Cornelius, Minneapolis, Minn., assignor to The Cornelius Company, Anoka, Minn., a corporation of Minnesota
Filed Sept. 6, 1966, Ser. No. 577,426
12 Claims. (Cl. 62—339)

ABSTRACT OF THE DISCLOSURE

Method and means for dispensing reconstituted beer from room-temperature water and beer-concentrate supplies including carbonating the water supply, thereafter refrigerating it to a low temperature and directing it to a mixing valve, directing the warm beer concentrate directly to the mixing valve, controlling the ratio of cold carbonated water and warm beer concentrate to produce both the desired dilution, resulting carbonation, and resulting temperature, and where necessary bypassing a portion of the warm beer supply only once through refrigeration means and reuniting it with an unrefrigerated portion of the beer concentrate enroute to the mixing valve, and controlling the amount of beer concentrate so bypassed in response to the resulting (warm) temperature of the beer concentrate downstream of the point where it is reunited with the remainder of the supply of beer concentrate.

---

This invention relates generally to beverage dispensing, and more specifically, to a method of and apparatus for dispensing reconstituted beer wherein such method and apparatus include the steps of and the means of carrying out the reconstituting of the beer that is dispensed.

The principles of the present invention may be included in beer dispensing systems operated by bartenders, home dispensing systems, and coin operated dispensing machines, and to that end the present invention includes the combining of chilled carbonated water with beer concentrate to produce a resulting mixture of proper strength, proper carbonation, and proper serving temperature. The present invention further preferably includes a process step or means by which a large reserve capacity is provided in the system without upsetting such automatic attainment of desired temperature and dilution.

The term "beer concentrate" as used herein refers to a liquid that has been prepared as at a brewery in accordance with a known process by which the initial volume is reduced to a fraction of the original volume by the removal of water from the beer by freezing such water out of the beer as ice. Such process produces virtually no loss, for example 1%, of beer solids, and upon the addition of water, the original strength is restored. The percentage of the original volume to which the beer is reduced typically is near 30%, is usually in the range between 25 and 35%, and is not critical and therefore could be higher or lower than this range.

Heretofore, a brewer has converted its beer to beer concentrate at one geographic location, shipped such concentrate to its own branch at a remote location, reconstituted the beer and bottled the same, labeling it as "reconstituted" beer. The process of making the beer concentrate has an effect similar to that of sterilization or pasteurization, and therefore, in the present invention, the beer concentrate that is stored is not provided with refrigeration, as spoilage does not occur.

There is a tendency for some beers to cloud up, and it is known in the art that chillproofing agents may be used with such beers. Any such commercially available substance may be used in the event that the beer concentrate would tend to get cloudy during shipment or storage.

At the present time, extremely fine filtration is also being practiced on ordinary beer by which yeast is removed, thereby extending the keeping quality of draft beer without refrigeration. Such filtration has no adverse effect if applied to the beer or the beer concentrate made from such beer.

Accordingly, it is an object of the present invention to provide a method of and apparatus for dispensing a reconstituted beer.

Another object of the present invention is to provide a method of and apparatus for reconstituting beer at the point of sale, such as in a manually operated dispensing system, or such as in a coin-controlled beverage dispensing machine.

A still further object of the present invention is to provide a method of and apparatus for reconstituting beer and dispensing such beer at a serving temperature which is automatically maintained at an ideal level, and especially with a large reserve capacity whereby such serving temperature will be maintained even though a large number of servings are withdrawn.

Yet another object of the present invention is to provide a beer dispensing system which utilizes beer concentrate so as to greatly reduce the bulk of liquid that is shipped, and so as to avoid pasteurization of the beer and as to avoid refrigeration of the barrel or tank in which the beer concentrate is shipped.

A still further object of the present invention is to provide a method of dispensing a reconstituted beer at an ideal serving temperature wherein due allowance is made for the temperature of the drinking vessel without refrigerating such drinking vessel.

Many other advantages, features and additional objects of the present invention will become manifest to those versed in the art upon making reference to the detailed description and the accompanying drawing sheet in which a preferred structural embodiment incorporating the principles of the present invention is shown by way of illustrative example.

The single figure is a diagrammatic representation of a system having apparatus which embodies a method for dispensing reconstituted beer in accordance with the principles of the present invention.

As shown on the drawing:

The principles of this invention are particularly useful when embodied in apparatus for dispensing reconstituted beer, such as the system illustrated in the drawing, generally indicated by the numeral 10. The system 10 includes a tank 11 in which there is provided a supply of beer concentrate which is stored without refrigeration, and which is allowed to have any temperature which the ambient conditions will provide. Although the temperature of the beer concentrate in the supply tank 11 is indefinite, such temperature is above the desired serving temperature.

If desired, the tank 11 may be pressurized to facilitate dispensing, and to insure a constant rate of flow of beer concentrate from the tank 11. Such pressurization is illustrated as being provided by a supply of pressurized carbon dioxide gas 12 connected by a line 13 through a pressure regulating valve 14 to the supply tank 11.

The system 10 further includes means for providing a supply of carbonated water generally indicated at 15, such means including a carbonator 16 which is arranged to be connected through a pair of pressure regulating valves 17, 18 to the supply of carbon dioxide gas 12 and to a pressurized water supply 19. The water supply 19 may include a pressurizing pump, filtration means, and the like.

The beer concentrate supply tank 11 is connected by a line 21 to a dispensing valve 22 of the mixing type, and the carbonator 16 is connected by a line 23 to the dispensing valve 22. The line 21 includes a throttling valve 24 and the line 23 includes a throttling valve 25 which may be set so as to provide the proper ratio of flow. Where the concentrate has been reduced to one-third of its original volume, the valve 25 should be set to allow two parts of carbonated water to flow for each part of beer concentrate that flows through the valve 24.

The system 10 includes means for refrigerating a portion of the carbonated water to a temperature below the sensing temperature, such means being generally indicated by the numeral 26. The refrigerating means 26 includes a coiled portion 27 of the carbonated water line 23, a bath or tank 28 containing a quantity of water 29, and means normally continually maintaining a quantity of ice 30 in the water 29 of the water bath 28, such means being generally indicated at 31. In this embodiment, the means 31 includes a refrigeration system 32 having an expansion coil 33 disposed in heat-transfer relation to the water 29 in the bath 28. Operation of the refrigeration system 32 causes a portion of the water 29 to freeze to form the ice bank 30, whereby, for pure water, the temperture of the water 29 will be 32° F. Carbonated water flowing through the carbonated water line 23, after passing through the coil 27, will thus have a temperature that approaches 32° F., and in practice, this temperature can be expected to be 34° F. Moreover, extended operation of the refrigeration system 32 merely grows additional ice in the ice bank 30 without lowering the temperature of the carbonated water in the coil 27 by any significant amount, and as additional carbonated water passes through the coil 27, the heat from such water merely melts a portion of the ice bank 30 without elevating the temperature of the water 29 in the bath 28. Thus the carbonated water portion that has passed through the line 23 has a substantially constant predetermined temperature which is below the serving temperature, and which typically is 34° F., but which is not below 32° F.

When the dispensing valve 22 is operated, it acts to withdraw some of the carbonated water that has been chilled and to withdraw some of the beer concentrate at a predetermined ratio of each, as explained above, and to discharge such mixture into a drinking vessel 40.

Assuming that the beer concentrate has a temperature of 70° F. and that the carbonated water has a temperature of 34° F., and further assuming that the throttling values 24 and 25 are so set as to produce a dilution of four parts of water for each part of beer concentrate, a mixture will be dispensed which has a temperature of approximately 40° F. In the United States, preferences are such that the ideal serving temperature is in the range of 42° F.–45° F. If the ambient temperature has caused the beer concentrate to have a temperature of 70° F., it would have likely caused the drinking vessel 40 to have a temperature of 70° F. Thus as the mixing is completed in the drinking vessel 40, the vessel 40 acts to raise the temperature of the mixture slightly as it cools from 70° F. to that of the reconstituted beer, thereby producing a mixture having a temperature which is slightly higher than it had at the moment of discharge from the dispensing valve 22.

The foregoing example presumes that it is unlikely that the ambient temperature would be below 70° F. However, there is a possibility that the ambient temperature may be higher. Correction is automatically provided for a higher ambient temperature by means of dividing the flow of beer concentrate in the line 21 through two branches 34, 35, the beer concentrate that has been separated from the branch 34 passing through the branch 35 which includes a coil 36 disposed in the water bath 28, or which is provided with any other convenient means of refrigeration. The branch 35 at its downstream end reunites with the branch 34 at a point 37. The temperature of the beer concentrate downstream of the point 37 is sensed by a temperature control 38 which is connected to operate a proportioning valve 39 to so set it that the magnitude of flow of beer concentrate through the branch 35 is such as to maintain the ultimate desired serving temperature. In the example given, the temperature control 38 would insure that the reunited concentrate would have a temperature of 70° F. as it enters the dispensing valve 22.

By proper setting of the regulator valves 17, 18 for the carbonator 16, a predetermined level of carbonation is produced. A typical level of carbonation desired for the reconstituted beer is 2.5–2.7 volumes of carbon dioxide gas dissolved in each volume of water. Carbonated water is therefore needed having a carbonation such that with a typical 30% dilution (corresponding to the percentage of original volume to which the beer concentrate has been reduced) it will have a carbonation falling within this range. For a given temperature of water, the pressure regulator valves 17 and 18 may thus be set to produce automatically the proper or desired initial level of carbonation in the carbonator 16. For a given pressure in the carbonator 16 and the supply tank 11, the position of the dispensing valve 22 will determine the rate of dispensing. The strength of the reconstituted beer is thus maintained by the setting of the throttling valves 24 and 25, and the temperature of the reconstituted beer is determined by the position of the proportioning valve 39. In this example, the position of the proportioning valve 39 is automatically controlled. Under some circumstances, it is desired to have a reconstituted beer of a different temperature. For example, perference in Great Britain is that beer should have a serving temperature of 56° F. For systems made for the export market, the desired temperature is thus obtained by merely adjusting the setting of the temperature control 38.

The proportioning valve 39 has been disclosed as being positioned to be a dividing valve disposed at the upstream ends of the branches 34 and 35 of the beer concentrate line 21. The valve 39 could also be located at the point 37, and could also be a simple 2-port valve located in either of the branches 34, 35. Whatever its location and type, it has the same effect, namely that of determining the magnitude of the beer concentrate flow through the branch 35.

Although various minor modifications might be suggested by those versed in the art, it should be understood that I wish to embody within the scope of the patent warranted hereon all such embodiments as reasonably properly come within the scope of my contribution to the art.

I claim as my invention:

1. A method for dispensing reconstituted beer at a serving temperature, comprising:
    (a) providing a supply of carbonated water above the serving temperature;
    (b) refrigerating only a portion of the carbonated water to a temperature below the serving temperature;
    (c) providing a supply of beer concentrate at a temperature above the serving temperature; and
    (d) when a serving is to be made, simultaneously mixing and withdrawing some of each of said refrigerated carbonated water and said beer concentrate at a predetermined ratio to provide a serving of reconstituted beer of proper strength at the serving temperature.

2. A method for dispensing reconstituted beer as claimed in claim 1, in which said refrigerating of the portion of the carbonated water is effected by passing it through a line immersed in water in which a quantity of ice is normally continually produced and maintained.

3. A method for dispensing reconstituted beer as claimed in claim 1, in which the temperature to which said portion of carbonated water is refrigerated is about 34° F., in which the beer concentrate is maintained at a temperature of about 70° F., and in which said predetermined ratio comprises about two to four parts of carbonated water for each part of beer concentrate.

4. A method for dispensing reconstituted beer as claimed in claim 1, in which a portion of the beer concentrate is separated only once from the supply thereof, then refrigerated, and then reunited with the supply to provide said temperature above the serving temperature.

5. A method for dispensing reconstituted beer as claimed in claim 4, in which the magnitude of said portion of beer concentrate is automatically controlled in response to the temperature of the beer concentrate after it has been reunited with other beer concentrate from the supply.

6. A method for dispensing reconstituted beer as claimed in claim 4, in which the initial temperature of said portion of beer concentrate is indefinite and is produced by the prevaling ambient air temperature.

7. Apparatus for dispensing reconstituted beer at a serving temperature comprising:
 (a) a tank for storing a supply of beer concentrate at an ambient temperature above the serving temperature;
 (b) means for providing a supply of carbonated water above the serving temperature;
 (c) means, connected to said carbonated water supply means, for refrigerating only a quantity of carbonated water to a temperature below serving temperature; and
 (d) a dispensing valve of the mixing type, connected to said carbonated-water refrigerating means and to said beer-concentrate tank, for dispensing a controlled ratio of beer concentrate and carbonated water at the serving temperature.

8. Apparatus as claimed in claim 7, in which said refrigerating means includes a carbonated water line, a water bath in which said line is disposed, and means for normally continually producing and maintaining a quantity of ice in the water of said water bath.

9. Apparatus as claimed in claim 7, which includes a divided line having two branches connected in parallel and connecting said concentrate tank to said dispensing valve and thus providing alternate flow paths in said branches, one branch of said line being in heat-transfer relation to refrigerating means and arranged to conduct part of the beer concentrate therethrough only once.

10. Apparatus as claimed in claim 9, which includes a proportioning valve by which the relative magnitude of flow of beer concentrate in said branches is adjusted, and means responsive to the temperature of beer concentrate entering said dispensing valve for controlling said proportioning valve to regulate the temperature of the beer concentrate at said dispensing valve.

11. Apparatus as claimed in claim 8, which includes a divided line having two branches connected in parallel and connecting said concentrate tank to said dispensing valve and thus providing alternate flow paths in said branches, one branch of said line extending through said water bath, a proportioning valve by which the relative magnitude of flow of beer concentrate in said branches is adjusted, and means responsive to the temperature of beer concentrate entering said dispensing valve for controlling said proportioning valve to regulate the temperature of the beer concentrate at said dispensing valve.

12. A method for dispensing reconstituted beer as claimed in claim 2, in which a quantity of the beer concentrate is divided into two portions, one of which portions is conducted by a second line only once through said water in which there normally is the ice, and is then reunited with the other portion, the relative magnitude of said portions being automatically controlled in response to the temperature of the reunited portions.

References Cited
UNITED STATES PATENTS

| 1,663,684 | 3/1928 | Doughty | 62—389 |
| 2,440,365 | 4/1948 | Copping et al. | 62—393 X |
| 2,502,610 | 4/1950 | Wegman | 62—339 |
| 2,961,082 | 11/1960 | Hanson et al. | 62—393 |
| 2,986,306 | 5/1961 | Cocanour | 62—389 |
| 3,021,685 | 2/1962 | Gore et al. | 62—393 X |
| 3,254,504 | 6/1966 | Thomas | 62—339 |
| 3,270,520 | 9/1966 | Geisler | 62—393 X |

LLOYD L. KING, *Primary Examiner.*